US010131516B1

United States Patent
Reynolds et al.

(10) Patent No.: US 10,131,516 B1
(45) Date of Patent: Nov. 20, 2018

(54) METHOD OF SPLICING A ROPE

(71) Applicants: Lynn Reynolds, Wasilla, AK (US);
Joseph F. Maestas, Wasilla, AK (US)

(72) Inventors: Lynn Reynolds, Wasilla, AK (US);
Joseph F. Maestas, Wasilla, AK (US)

( * ) Notice: Subject to any disclaimer, the term of this patent is extended or adjusted under 35 U.S.C. 154(b) by 490 days.

(21) Appl. No.: 15/051,946

(22) Filed: Feb. 24, 2016

(51) Int. Cl.
*B65H 69/06* (2006.01)
*B29C 65/02* (2006.01)
*B29C 65/66* (2006.01)
*B29L 31/00* (2006.01)

(52) U.S. Cl.
CPC ............. *B65H 69/06* (2013.01); *B29C 65/02* (2013.01); *B29C 65/66* (2013.01); *B29L 2031/707* (2013.01)

(58) Field of Classification Search
None
See application file for complete search history.

(56) References Cited

U.S. PATENT DOCUMENTS 5,337,548 A * 8/1994 Kelly ................ D07B 7/162
174/93

FOREIGN PATENT DOCUMENTS

| FR | 1604108 A | * | 8/1971 |
| GB | 2265162 A | * | 9/1993 |

* cited by examiner

*Primary Examiner* — Jeffry H Aftergut
(74) *Attorney, Agent, or Firm* — Michael J. Tavella

(57) ABSTRACT

A method of splicing a rope where the ends of the rope are taped and then cut, leaving a fresh face on both ends of the rope. A length of shrink-wrap tubing is placed over one of the rope ends and slid up out of the way. Next, epoxy is applied to the fresh cut ends, and the ends of the rope are brought together and clamped in a jig. The splice is wrapped in tape while the epoxy cures. Once cured, the tape is removed and the joint cleaned so that the diameter of the splice is the same thickness as the rope. Next, additional epoxy is added to the joint and the shrink-wrap tubing is slid over the splice. A heat gun is used to shrink the tubing. Any excess epoxy is removed with a small knife to complete the splice. The rope is then ready for use.

9 Claims, 12 Drawing Sheets

METHOD OF SPLICING A ROPE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to splicing rope particularly to rope splices that produce a splice with the same diameter as the original rope.

2. Description of the Prior Art

Ropes have been used for millennia. Ropes have been connected or repaired over the centuries using a variety of splices. Most often these splices produce a rope section that is thicker than the original rope. Splicing techniques involve knots or twisting fibers together to make the connection. These splices are usually larger than the original rope.

BRIEF DESCRIPTION OF THE INVENTION

The instant invention overcomes these difficulties. In this invention, a method of splicing the rope is used to tie the ends of the rope together such that the diameter of the spice is not greater than the overall diameter of the rope. The splice does leave the rope weaker than the original rope. Depending on the use, where there is a large safety margin, this weakening is not a problem. The method can be used for a new rope to be spliced as well as for a rope that is to be repaired.

The primary use for the splicing method though is for use with our rope climbing machines. These machines use a closed loop system with a pipe that requires the rope to be connected together after it has been threaded through the machine's mechanism.

The method uses a shrink-wrap tube and epoxy to make the splice. Once completed, the splice has the same diameter as the original rope, which means the spliced rope can move through the machine's mechanism without binding. Moreover, the method can be used for other ropes as well.

For either a rope to be spliced as new or, to repair a broken rope, the ends of the rope are taped and then cut, leaving a fresh face on both ends of the rope. A length of shrink-wrap tubing is placed over one of the rope ends and slid up out of the way. Next, epoxy is applied to the fresh cut ends, and the ends of the rope are brought together and clamped in a jig. The splice is wrapped in tape while the epoxy cures. Once cured, the tape is removed and the joint cleaned so that the diameter of the splice is the same thickness as the rope. Next, additional epoxy is added to the joint and the shrink-wrap tubing is slid over the splice. A heat gun is used to shrink the tubing. Any excess epoxy is removed with a small knife to complete the splice. The rope is then ready for use.

DETAILED DESCRIPTION OF THE INVENTION

Figure 1:
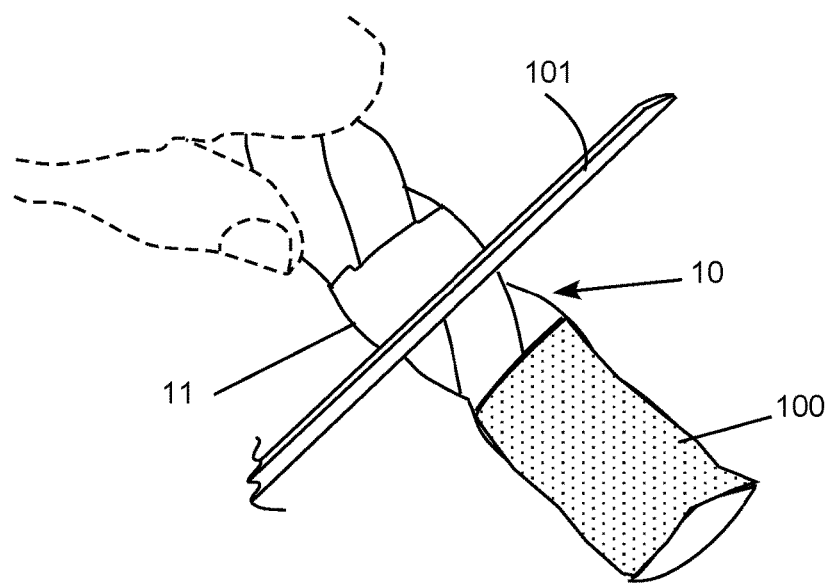
FIG. 1 is a detail view of one end of a rope before being spliced.

Referring now to FIG. 1 a detail view of one end of a rope 10 before being spliced is shown. Note that this rope can be a new rope to be joined into a loop or a rope loop that has broken. In either case, tape 100 may have been placed over the end to prevent the rope 10 from unraveling. To begin the process of splicing, the first step is to wrap a piece of electrical tape 11 at some distance behind the end of the rope, as shown. In the preferred embodiment, the electrical tape 11 is electrical tape because it has an elastic capability that helps to compress the rope. Next, a knife 101 is used to cut the rope at the end of the piece of electrical tape 11. The result is shown in FIG. 2.

Figure 2:
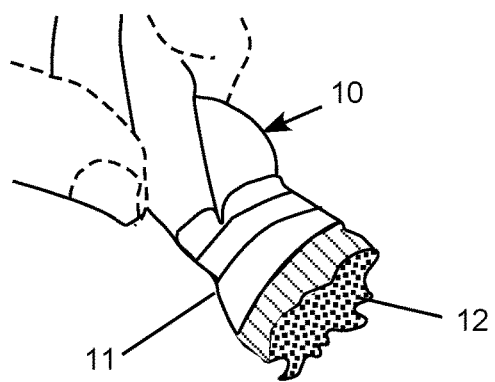
FIG. 2 is a detail view of the prepared rope end now ready for splicing.

FIG. 2 is a detail view of the prepared rope end 12 now ready for splicing. Here, the rope 10 is shown with the cut end 12 visible just outside of the electrical tape 11. Note that both ends of the rope are prepared in the same manner.

Figure 3:
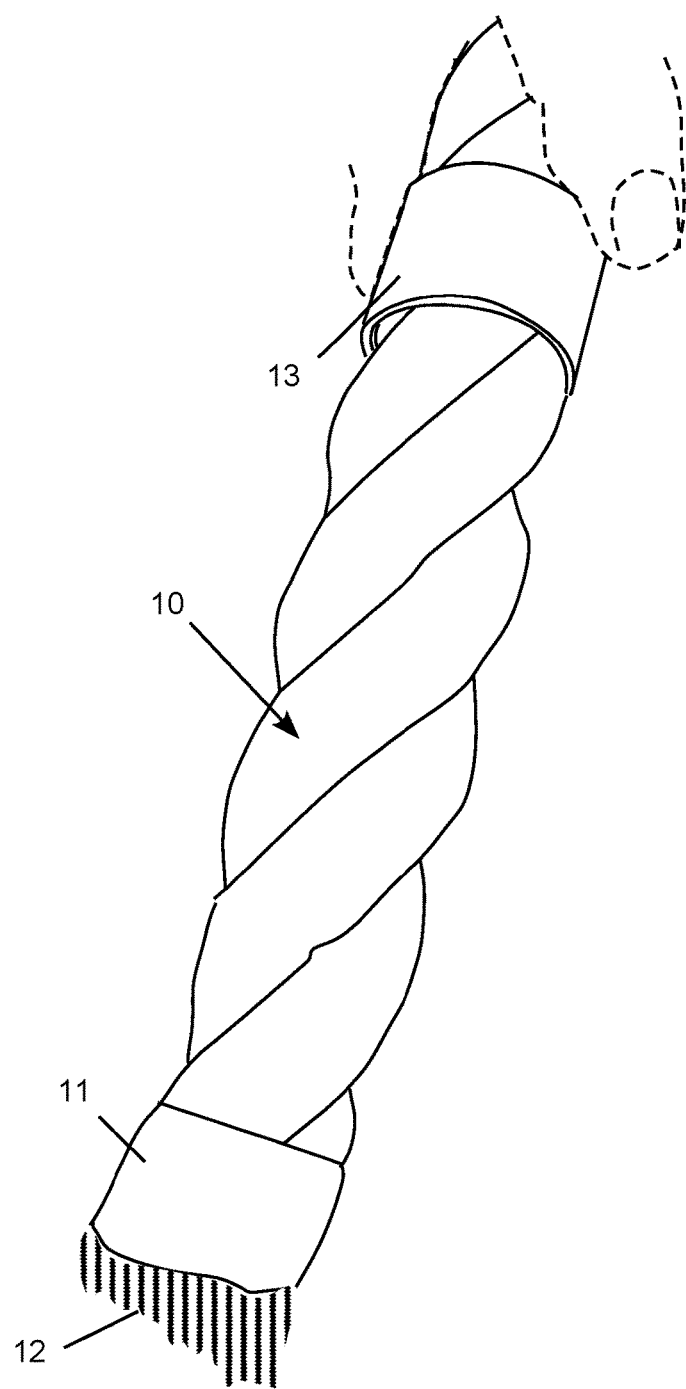
FIG. 3 is a detail view of the placement of a length of shrink-wrap tubing on one end or the rope, prior to splicing.

FIG. 3 is a detail view of the placement of a length of shrink-wrap tubing 13 on one end or the rope 10, prior to splicing. Prior to making the splice, a length of the shrink-wrap tubing 13 is placed on one end of the rope. Only one length of shrink-wrap tubing 13 is needed.

Figure 4:
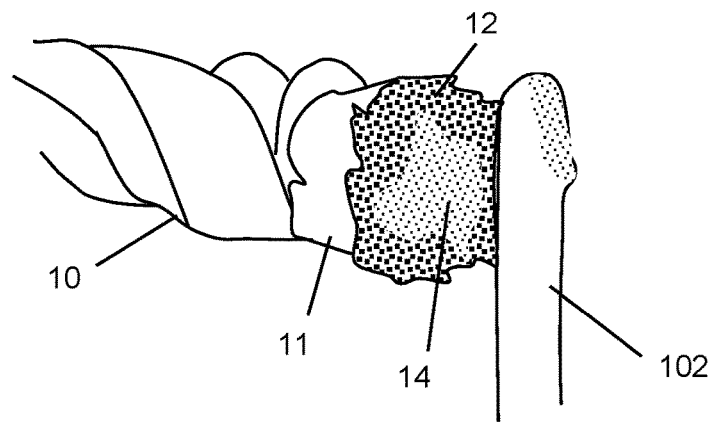
FIG. 4 is a detail view of one end of the rope where epoxy is being applied.

FIG. 4 is a detail view of one end of the rope where epoxy 14 is being applied. The next step in the process is to apply epoxy 14 to both ends of the rope. Here, the rope 10 is shown with the end 12 receiving the epoxy 14, which is applied with a small stick 102, or similar tool, as shown. In the preferred embodiment, the epoxy is DURAMIX fast set from 3M Corporation, and preferably, the medium set time product.

Figure 5:
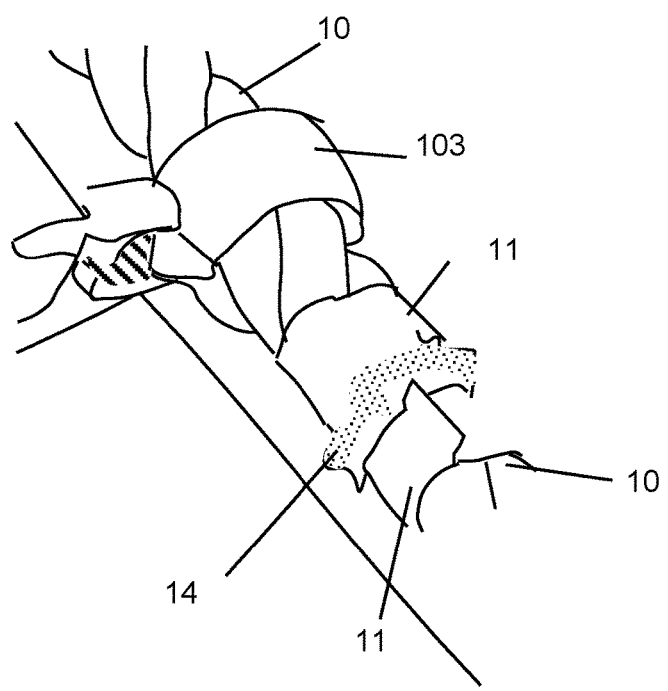
FIG. 5 is a view of the now glued and joined rope being clamped in a jig.

FIG. 5 is a view of the now glued and joined rope 10 being clamped in a jig. In this figure, the rope ends are now glued with epoxy and brought together to join them and to allow the epoxy to cure. As before, the rope 10 is shown with the electrical tape 11 and the epoxy 14. The rope is now held by a pair of clamps 103 (see FIG. 6).

Figure 6:
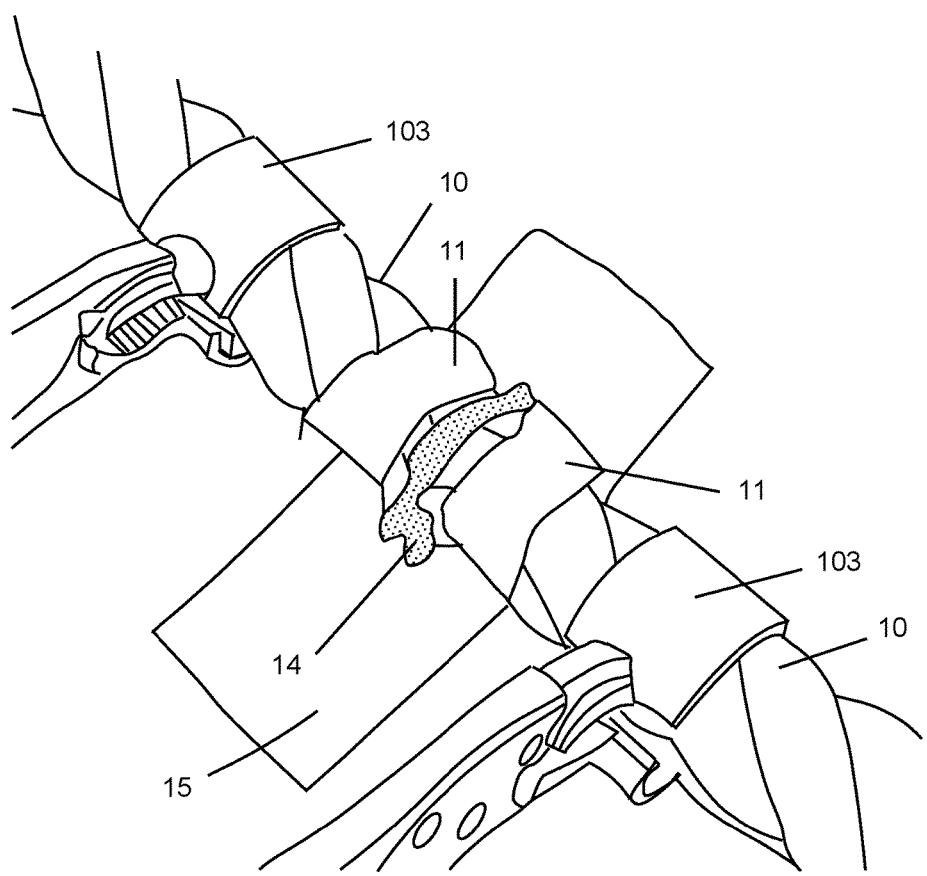
FIG. 6 is a detail view of the rope in the jig and the glued splice being covered with tape.

FIG. 6 is a detail view of the rope in the jig and the glued splice being covered with tape. Here, the two clamps 103 are shown holding the joined rope 10. The next step is to wrap the tapes 11 with another clear piece of tape 15. Note that the tape 15 covers the epoxy as well as the two pieces of electrical tape 11.

Figure 7:
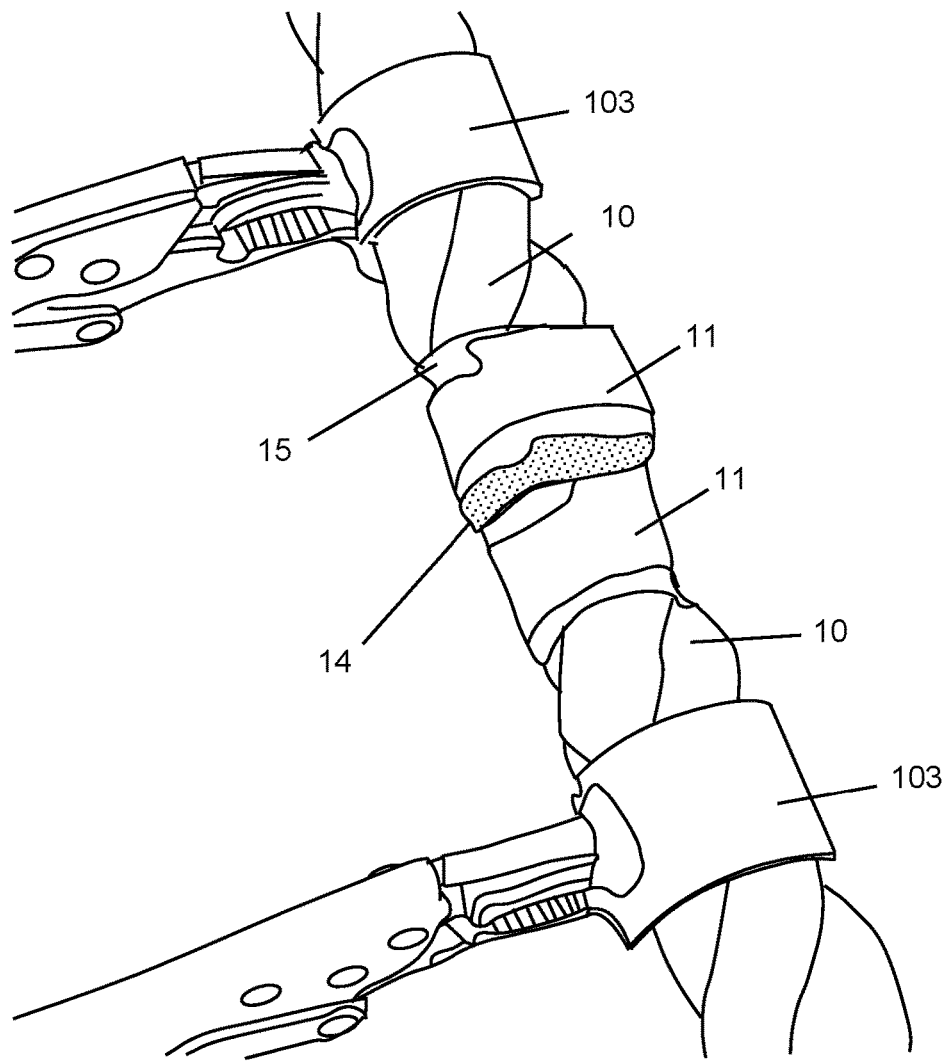
FIG. 7 is a detail view of the rope in the jig and the glued splice covered with tape during curing of the epoxy.

Once the tape 15 is applied, the joint is allowed to cure for an adequate time. FIG. 7 is a detail view of the rope in the jig and the glued splice covered with tape during curing of the epoxy.

Figure 8:
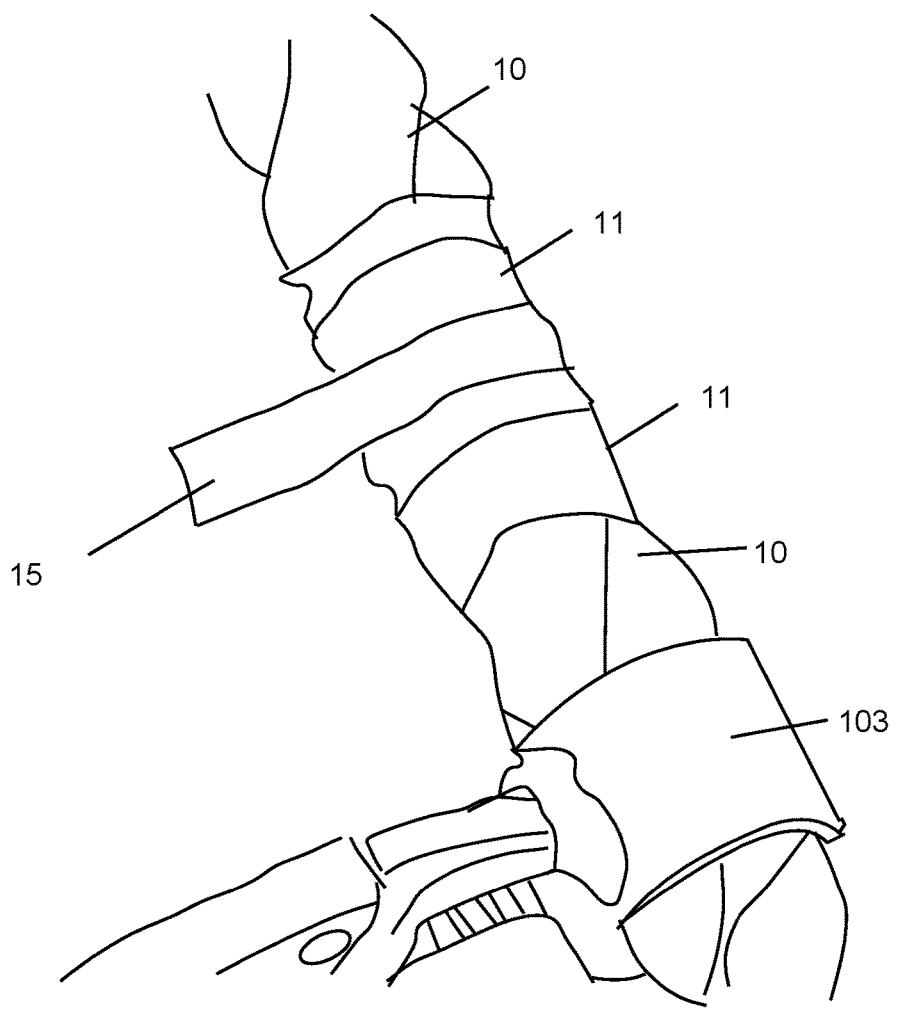
FIG. 8 is a detail view of the rope in the jig showing the joint now cured and the tape being removed.

FIG. 8 is a detail view of the rope in the jig showing the joint now cured and the tape being removed. Once the epoxy has fully cured, all of the tape, both the pieces 11 and the piece 15, is removed from the rope 10.

Figure 9:
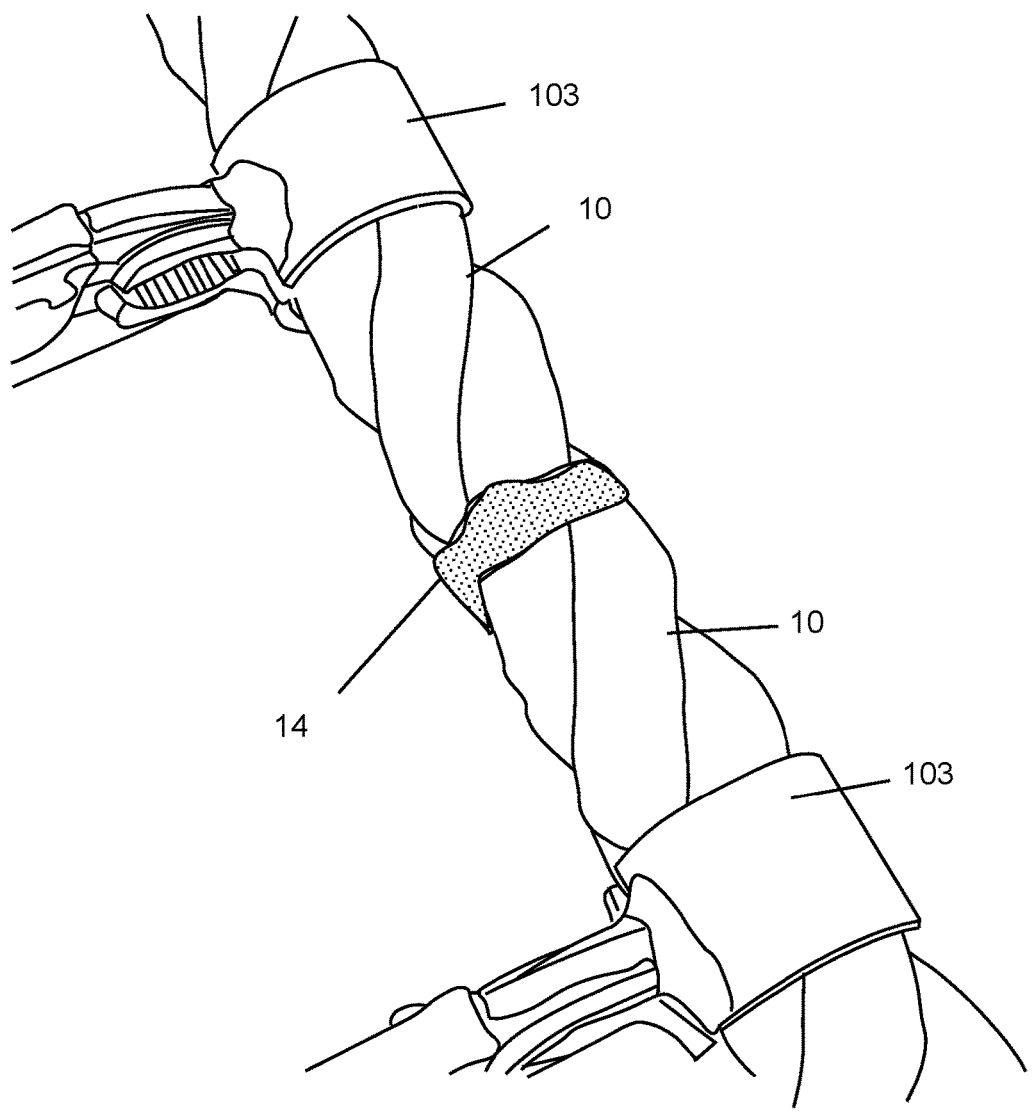
FIG. 9 is a detail of the splice after the epoxy has been sanded down to remove any excess epoxy.

FIG. 9 is a detail of the splice after the epoxy has been trimmed down to remove any excess epoxy. Here, the rope 10 is shown with the cured splice 14. Note that the epoxy 14 has been carefully trimmed down to conform to the thickness of the rope 10. Note that the rope 10 is still held in the clamps 103.

Figure 10:
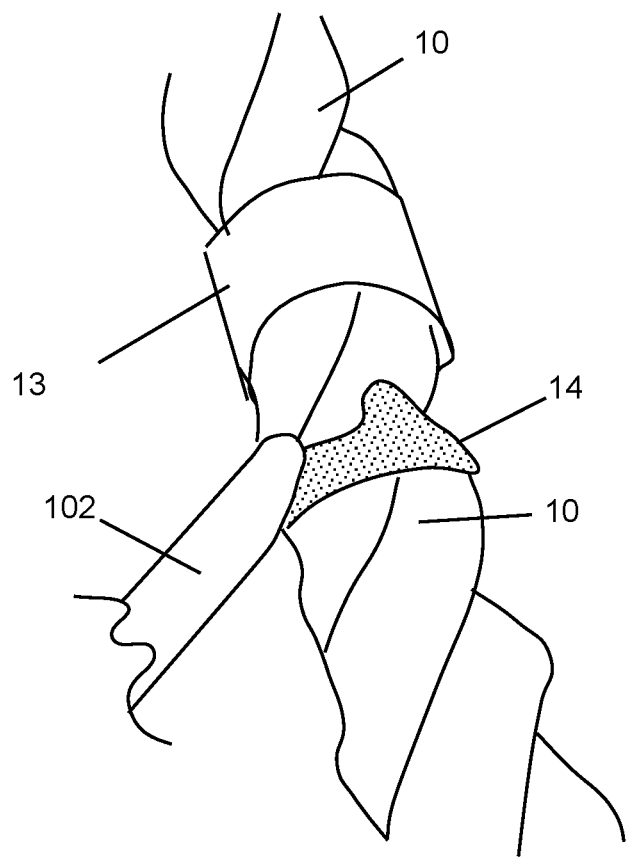
FIG. 10 is a detail of the splice that shows the splice receiving an additional application of epoxy.

FIG. 10 is a detail of the splice that shows the splice receiving an additional application of epoxy. In this figure, the clamps are removed and the shrink-wrap tubing 13 is shown slid down the rope 10 closer to the splice. Now, additional epoxy is added to the joint as shown.

Figure 11:
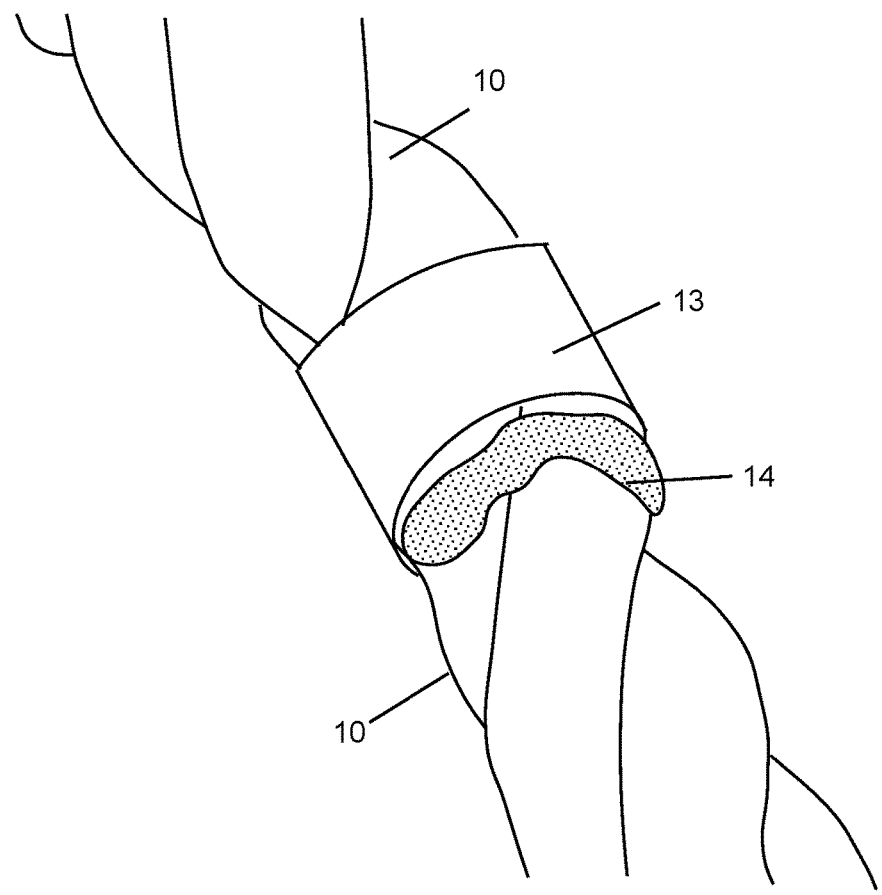
FIG. 11 is a detail of the splice that shows the splice with the shrink-wrap cover in place and excess epoxy oozing out from under the shrink-wrap cover.

FIG. 11 is a detail of the splice that shows the splice with the shrink-wrap tubing 13 in place and excess epoxy 14 oozing out from under the shrink-wrap tubing.

Figure 12:
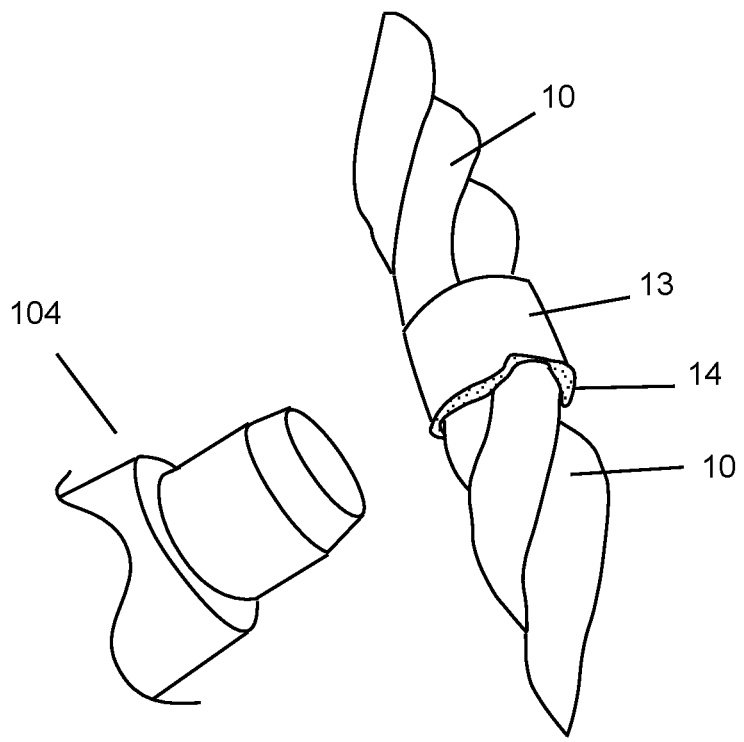
FIG. 12 is a detail of the splice that shows a heat gun being used to shrink the shrink-wrap cover over the splice.

FIG. 12 is a detail of the splice that shows a heat gun 104 being used to shrink the shrink-wrap tubing 13 over the splice. Note that the shrink-wrap tubing is centered over the joint. The epoxy 14 shown oozing out is on the side of the shrink-wrap tubing, apart from the main joint.

Figure 13:
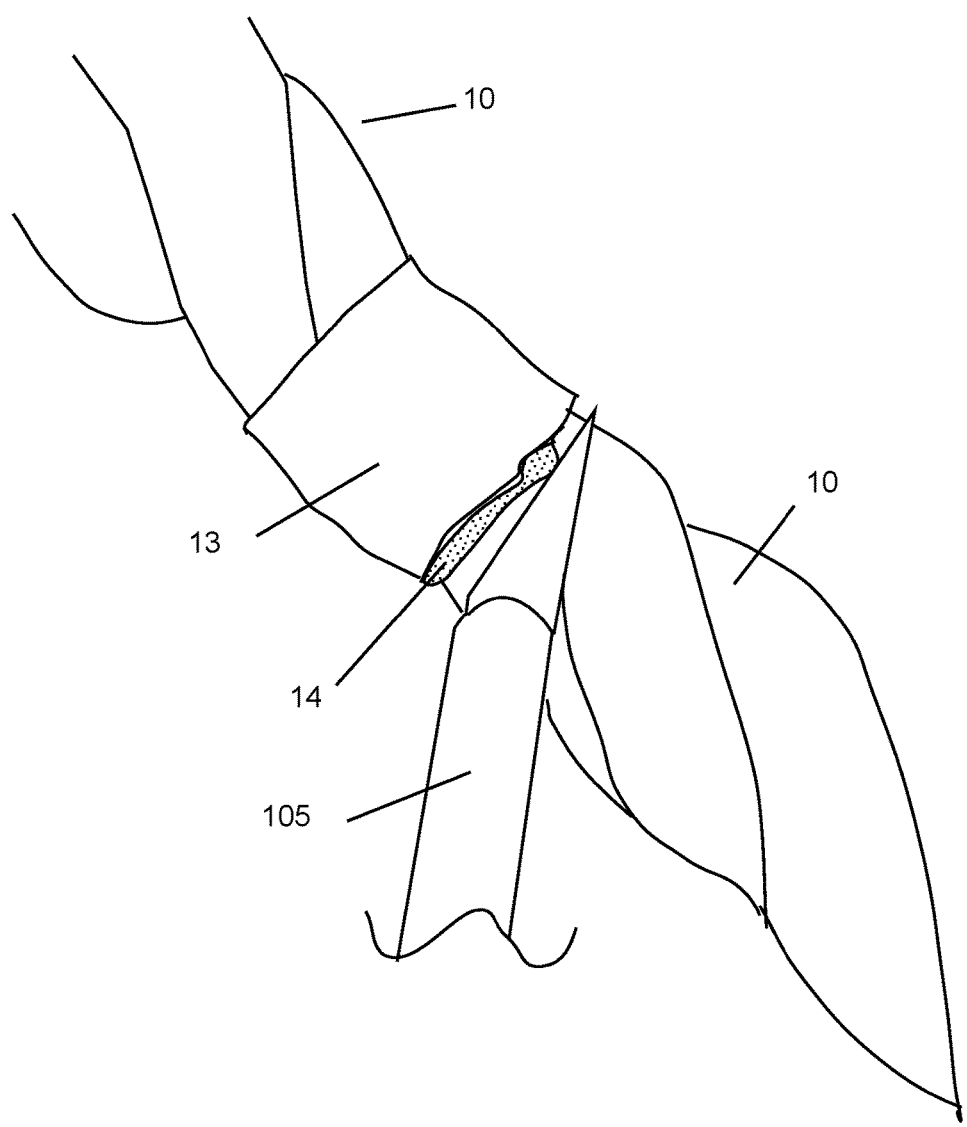
FIG. 13 is a detail showing the completed splice and a knife removing any excess epoxy from the splice.
Figure 14:
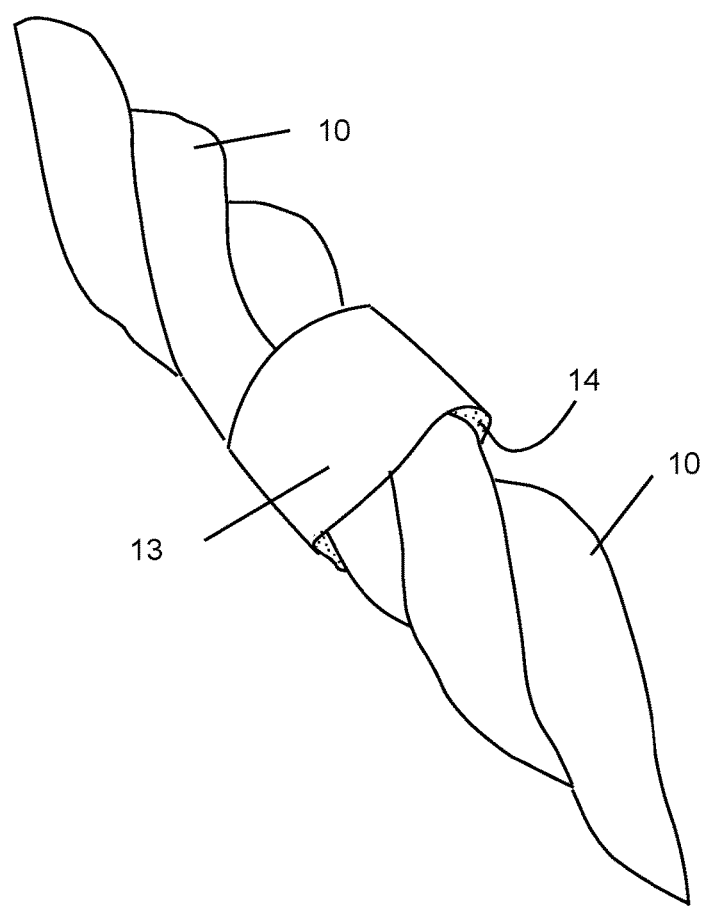
FIG. 14 is a detail showing the final completed splice.

FIG. 13 is a detail showing the completed splice and a knife 105 removing any excess epoxy 14 from the splice. Once the epoxy b14 is cured and the shrink-wrap tubing 13 has been compressed around the splice, the final step is to clean up the splice by carefully removing any epoxy that has oozed out from under the shrink-wrap tubing. At that point, the spice is complete and the joined rope is ready to use, as shown in FIG. 14.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. A method of splicing a rope having two ends and a diameter, comprising the steps of:
   a) wrapping a length of electrical tape over each end of the rope;
   b) sliding a length of shrink-wrap tubing over one end of the rope;
   c) applying a quantity of epoxy to the ends of said rope;
   d) pressing rope ends together, forming a splice;
   e) holding the rope together until the epoxy cures;
   f) removing the tape;
   g) applying a second coat of epoxy over the splice;
   h) sliding the length of shrink-wrap tubing over the splice;
   i) heating said length of shrink wrap tubing until said length of shrink-wrap tubing shrinks about said splice; and
   j) cleaning up the epoxy glue joint.

2. The method of claim 1 wherein the splice has the same diameter as the rope.

3. The method of claim 1 wherein the epoxy is mixed before it is applied to the rope.

4. The method of claim 1 further comprising the step of: prior to step e, applying a second length of tape over the splice.

5. The method of claim 1 further comprising the step of: prior to step g, filing the cured epoxy until it is the same diameter as the rope.

6. The method of claim 1 further comprising the step of: prior to step e, inserting the rope into a jig that holds the rope in a stable position.

7. The method of claim 6 wherein the jig includes at least one clamp.

8. The method of claim 6 wherein the jig includes a pair of clamps.

9. The method of claim 8 wherein the splice is positioned between said pair of clamps.

\* \* \* \* \*